(12) United States Patent
Yum et al.

(10) Patent No.: US 10,033,507 B2
(45) Date of Patent: Jul. 24, 2018

(54) METHOD FOR PERFORMING CHANNEL ESTIMATION, AND APPARATUS THEREFOR

(71) Applicant: LG ELECTRONICS INC., Seoul (KR)

(72) Inventors: Kunil Yum, Seoul (KR); Hyungtae Kim, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/319,669

(22) PCT Filed: Jul. 21, 2015

(86) PCT No.: PCT/KR2015/007570
§ 371 (c)(1),
(2) Date: Dec. 16, 2016

(87) PCT Pub. No.: WO2016/017982
PCT Pub. Date: Feb. 4, 2016

(65) Prior Publication Data
US 2017/0187507 A1 Jun. 29, 2017

Related U.S. Application Data

(60) Provisional application No. 62/029,573, filed on Jul. 28, 2014.

(51) Int. Cl.
*H04L 5/00* (2006.01)
*H04B 7/04* (2017.01)

(52) U.S. Cl.
CPC ............. *H04L 5/0057* (2013.01); *H04B 7/04* (2013.01); *H04L 5/0048* (2013.01)

(58) Field of Classification Search
None
See application file for complete search history.

(56) References Cited

U.S. PATENT DOCUMENTS 9,397,738 B2 * 7/2016 Xu ........................ H04B 7/0417
9,900,068 B2 * 2/2018 Park ...................... H04B 7/0469
(Continued)

FOREIGN PATENT DOCUMENTS

WO WO 2014/035136 A1 3/2014

*Primary Examiner* — Steve R Young
(74) *Attorney, Agent, or Firm* — Birch, Stewart, Kolasch & Birch, LLP

(57) ABSTRACT

A method for reporting a channel state for a downlink channel to be transmitted via a two-dimensional array of antenna elements consisting of one or more horizontal antenna groups and vertical antenna groups in accordance with one embodiment of the present invention, the method being performed by a terminal, comprises the steps of: receiving a channel state information-reference signal (CSI-RS) configuration for at least one vertical antenna group and a CSI-RS configuration for at least one horizontal antenna group; and calculating channel state information on the downlink channel using the received CSI-RS configurations and transmitting the channel information to a serving cell, wherein the channel state information comprises individual channel state information for a channel of the at least one vertical antenna group (hereinafter, 'vertical channel') and a channel of the at least one horizontal antenna group (hereinafter, 'horizontal channel'), a combination of the individual channel state information, or joint channel state information of the vertical channel and the horizontal channel, each of which is assigned transmission priority, and the channel state information can be transmitted according to the transmission priority.

9 Claims, 14 Drawing Sheets

(56) References Cited

U.S. PATENT DOCUMENTS

| | | |
|---|---|---|
| 2012/0207047 A1 | 8/2012 | Liao et al. |
| 2013/0058295 A1* | 3/2013 | Ko .................. H04B 7/063 |
| | | 370/329 |
| 2013/0258964 A1 | 10/2013 | Nam et al. |
| 2013/0272151 A1 | 10/2013 | Thomas et al. |
| 2013/0308715 A1* | 11/2013 | Nam .................. H04B 7/0469 |
| | | 375/267 |
| 2014/0010126 A1* | 1/2014 | Sayana .............. H04J 3/1694 |
| | | 370/280 |
| 2014/0140281 A1 | 5/2014 | Choudhury et al. |
| 2014/0254517 A1* | 9/2014 | Nam .................. H04B 7/0417 |
| | | 370/329 |

* cited by examiner (a)

(b)

(a)

(b)

(c)

Block A

Block B

FIG. 13

METHOD FOR PERFORMING CHANNEL ESTIMATION, AND APPARATUS THEREFOR

CROSS REFERENCE TO RELATED APPLICATIONS

This application is the National Phase of PCT International Application No. PCT/KR2015/007570, filed on Jul. 21, 2015, which claims priority under 35 U.S.C. 119(e) to U.S. Provisional Application No. 62/029,573, filed on Jul. 28, 2014, all of which are hereby expressly incorporated by reference into the present application.

TECHNICAL FIELD

The present invention relates to a wireless communication system, and more particularly, to a method for reporting a channel state through channel estimation using antenna ports partially and apparatus therefor.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE OF THE INVENTION

Technical Task

The present invention proposes a scheme for a channel state reporting. Through this, the present invention proposes a signaling scheme related to a more efficient channel state reporting.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of reporting a channel state of a downlink channel transmitted through a 2D array antenna element including one or more horizontal antenna groups and vertical antenna groups, the method performed by a terminal, the method including receiving channel state information-reference signal (CSI-RS) configuration for the at least one vertical antenna group and CSI-RS configuration for the at least one horizontal antenna group and calculating and transmitting to a serving cell channel state information on the downlink channel using the received CSI-RS configuration, wherein the channel state information includes individual channel state information on a vertical channel for the at least one vertical antenna group and a horizontal channel for the at least one horizontal antenna group, joint of the individual channel state information, or integrated channel state information of the vertical channel and the horizontal channel, each of the channel state information having a transmission priority, and wherein the channel state information is transmitted according to the transmission priority.

Additionally or alternatively, if at least two transmission instances in which the channel state information is transmitted overlap with each other, the rest of the channel state informations may be dropped except the channel state information having the highest transmission priority.

Additionally or alternatively, if the transmission priorities of at least two channel state informations are equal to each other, one of the at least two channel state information may be dropped according to an additional reference.

Additionally or alternatively, the additional reference may be related to a transmission period of the individual channel state information.

Additionally or alternatively, wherein the transmission priority may be related to a transmission period of the individual channel state information.

Additionally or alternatively, a transmission period of the individual channel state information on the vertical channel may be set to have a specific relationship with a transmission period of the individual channel state information on the horizontal channel.

Additionally or alternatively, the individual channel state information on the vertical channel may include rank information of the vertical channel, first precoding information of the vertical channel, and second precoding information of the vertical channel, the rank information of the vertical channel may have a transmission period greater than that of the first precoding information of the vertical channel, and the first precoding information of the vertical channel may have a transmission period greater than that of the second precoding information of the vertical channel.

Additionally or alternatively, the individual channel state information on the horizontal channel may include rank information of the horizontal channel, first precoding information of the horizontal channel, and second precoding information of the horizontal channel, the rank information of the horizontal channel may have a transmission period greater than that of the first precoding information of the horizontal channel, and the first precoding information of the horizontal channel may have a transmission period greater than that of the second precoding information of the horizontal channel.

Additionally or alternatively, the integrated channel state information of the vertical channel and the horizontal channel may include integrated channel quality information of the vertical channel and the horizontal channel and the integrated channel quality information may have a transmission period smaller than that of the individual channel state information on the vertical channel and the individual channel state information on the horizontal channel.

Additionally or alternatively, the joint of the individual channel state information may be configured to have a highest or lowest transmission priority among the individual channel state information.

In another technical aspect of the present invention, provided herein is a terminal configured to report a channel state of a downlink channel transmitted through a 2D array antenna element including one or more horizontal antenna groups and vertical antenna groups, the terminal including a radio frequency (RF) unit and a processor configured to control the RF unit, wherein the processor is further configured to: receive channel state information-reference signal (CSI-RS) configuration for the at least one vertical antenna group and CSI-RS configuration for the at least one horizontal antenna group and calculate and transmit to a serving cell channel state information on the downlink channel using the received CSI-RS configuration, wherein the channel state information includes individual channel state informations on a vertical channel for the at least one vertical antenna group and a horizontal channel for the at least one horizontal antenna group, joint of the individual channel state information, or integrated channel state information of the vertical channel and the horizontal channel, each of the channel state information having a transmission priority, and wherein the channel state information is transmitted according to the transmission priority.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, a channel state reporting through channel estimation using antenna ports partially is enabled, efficiency in antenna port configuration for the channel state reporting is enhanced, and an efficient channel state reporting is possible.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 shows a single channel state reporting chain corresponding to vertical and horizontal antenna blocks.

BEST MODE FOR INVENTION

Figure 1:
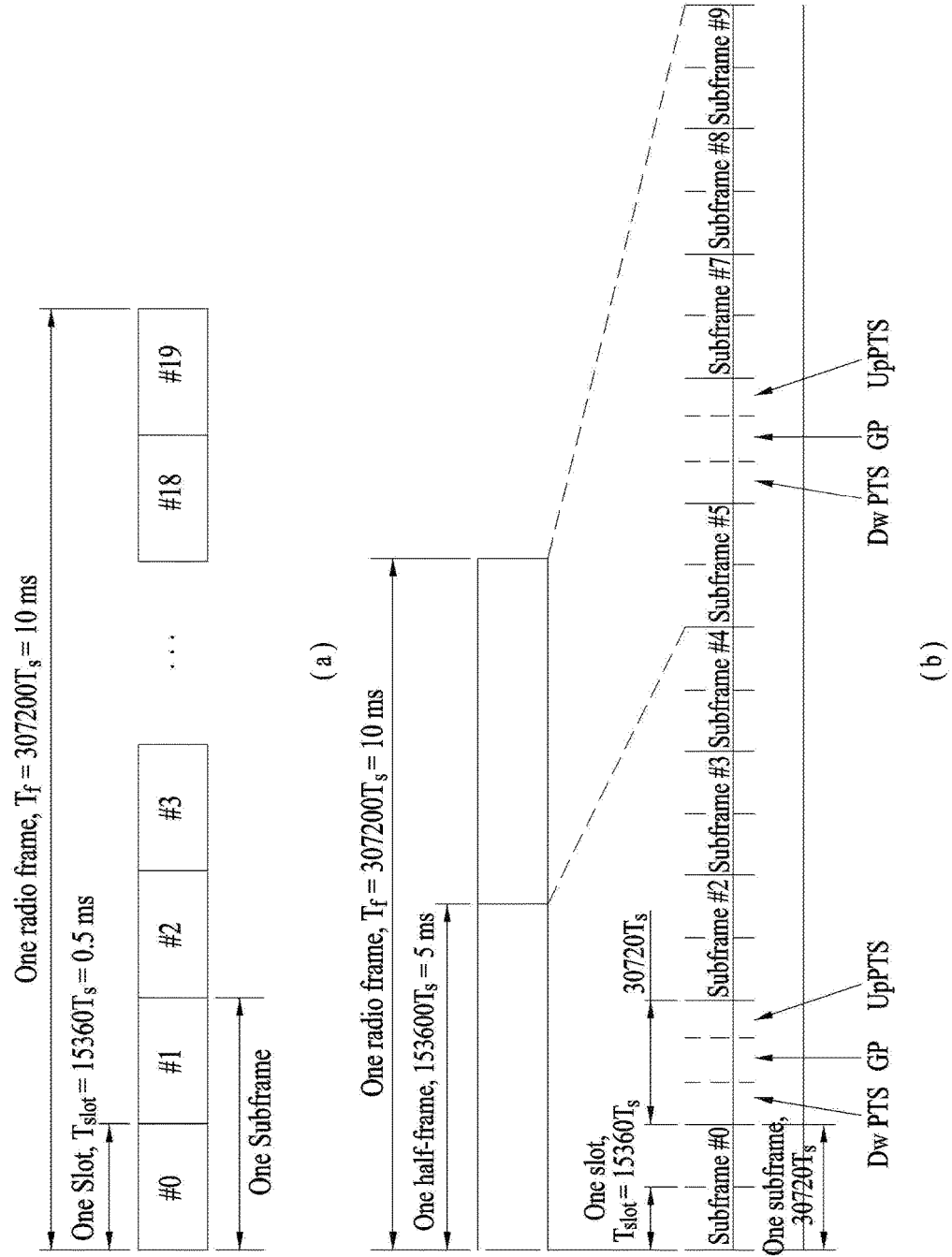
FIG. 1 shows one example of a radio frame structure used by a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | $6592 \cdot T_s$ | | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | | $20480 \cdot T_s$ | | |
| 2 | $21952 \cdot T_s$ | | | | $23040 \cdot T_s$ | | |
| 3 | $24144 \cdot T_s$ | | | | $25600 \cdot T_s$ | | |
| 4 | $26336 \cdot T_s$ | | | | $7680 \cdot T_s$ | $4384 \cdot T_s$ | $5120 \cdot T_s$ |
| 5 | $6592 \cdot T_s$ | | $4384 \cdot T_s$ | $5120 \cdot T_s$ | $20480 \cdot T_s$ | | |

TABLE 2-continued

| | | Normal cyclic prefix in downlink | | | Extended cyclic prefix in downlink | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
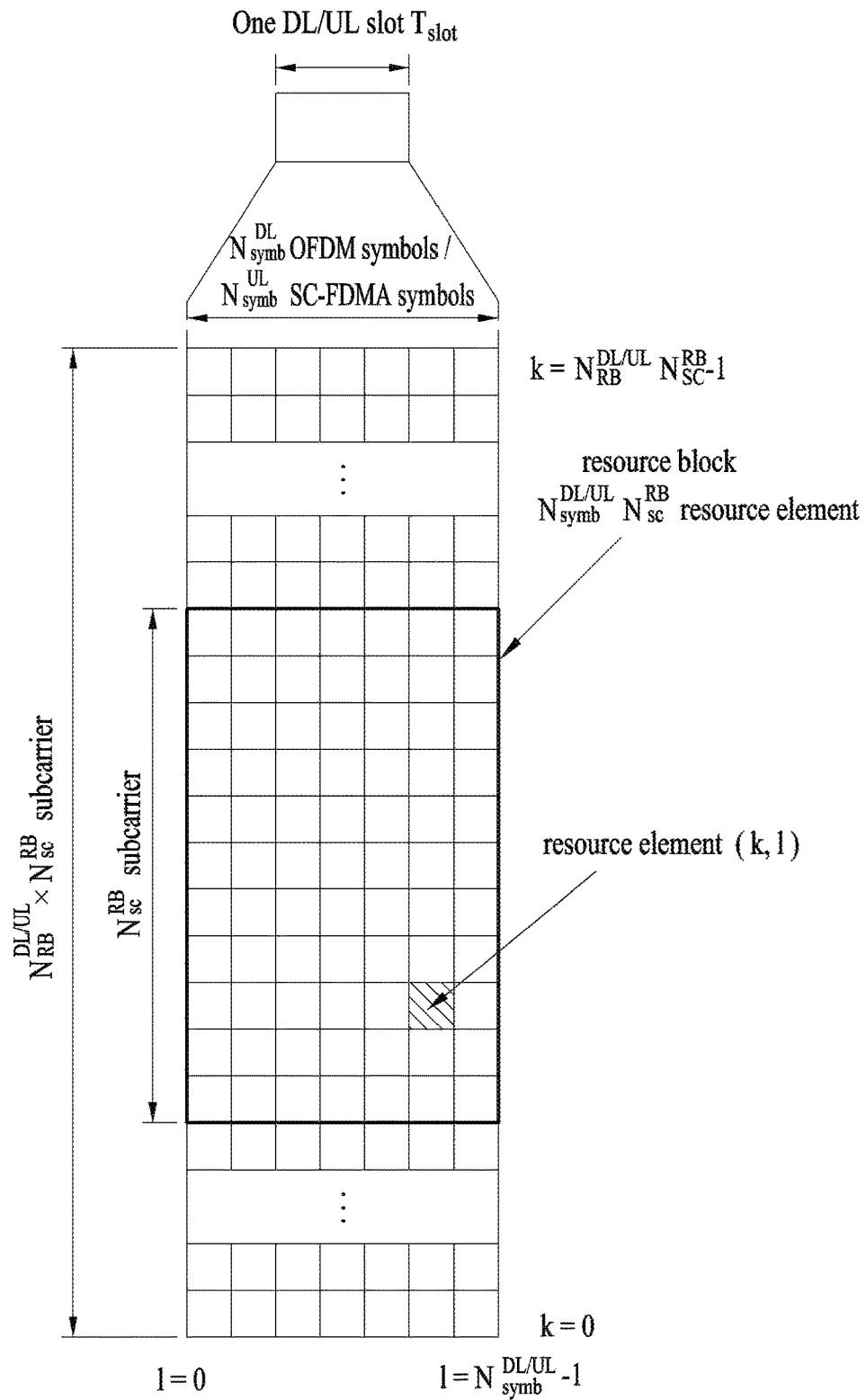
FIG. 2 shows one example of an uplink/downlink (UL/DL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
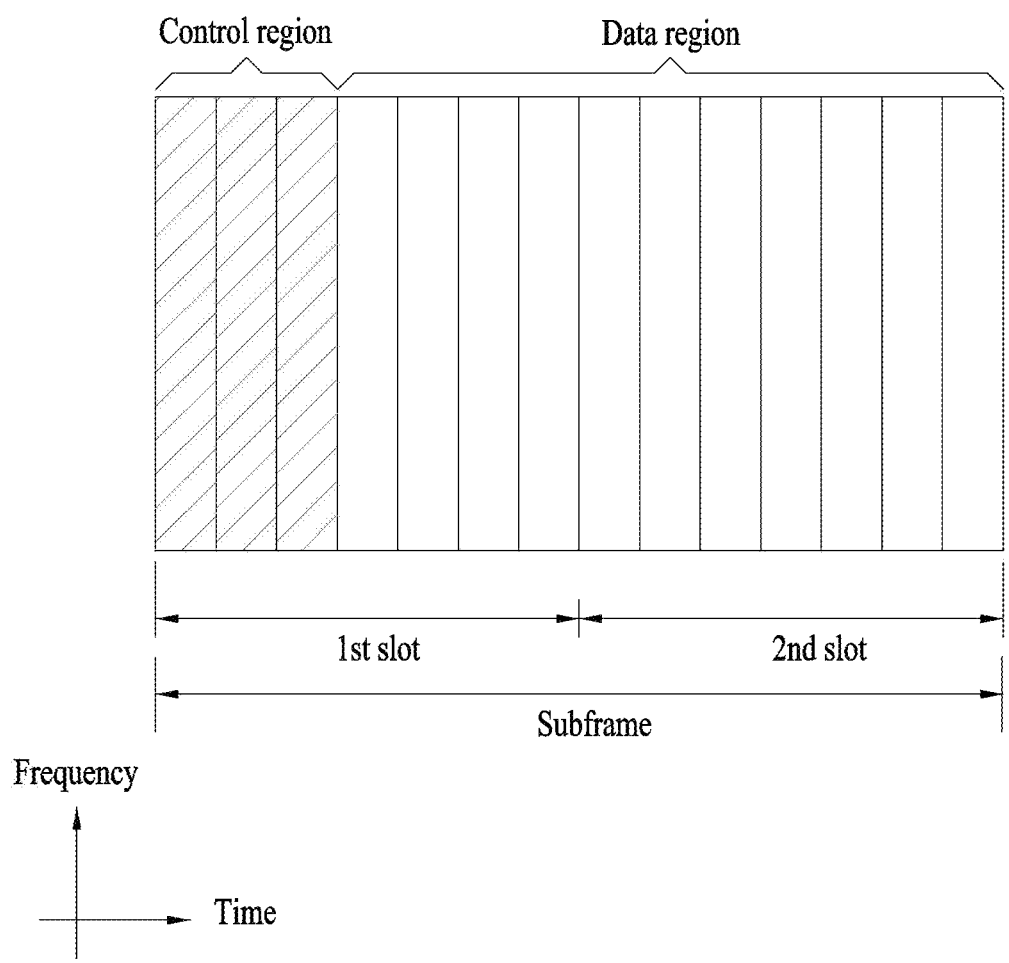
FIG. 3 shows one example of a downlink (DL) subframe structure used by 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
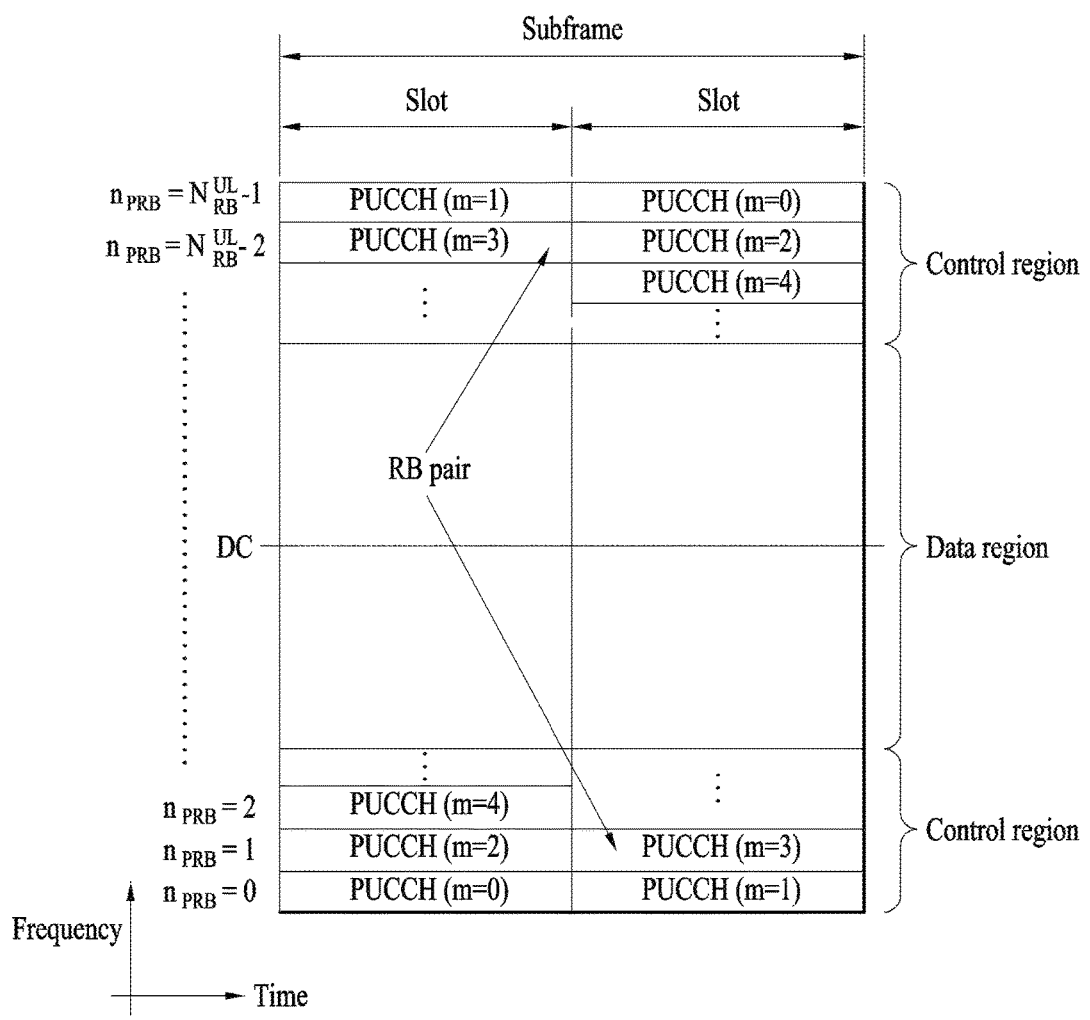
FIG. 4 shows one example of an uplink (UL) subframe structure used by 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned for UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
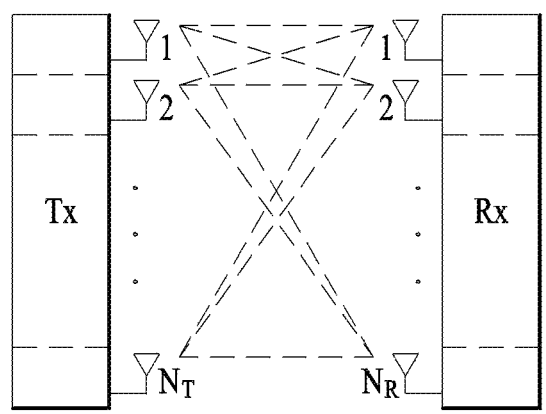
FIG. 5 is a block diagram of MIMO (multi-input multi-output) used by 3GPP LTE/LTE-A system.
Figure 5:
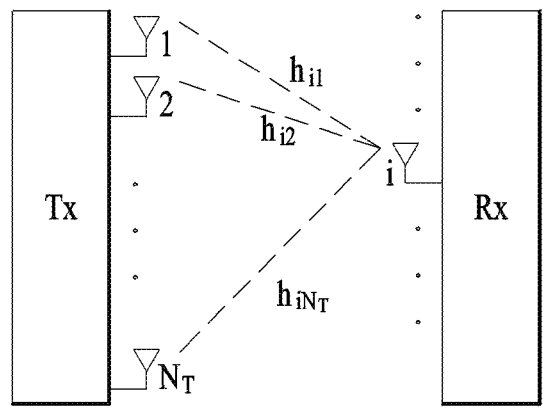

FIG. 5 shows the configuration of a wireless communication system including multiple antennas.

As shown in FIG. 5(a), when both the number of transmit (Tx) antennas and the number of Rx antennas are increased respectively to NT and NR, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system.

Mathematical modeling of a communication method for use in the above-mentioned MIMO system will hereinafter be described in detail. It is assumed that there are NT Tx antennas and NR Rx antennas.

In the case of a transmission signal, a maximum number of transmission information pieces is NT under the condition that NT Tx antennas are used, so that the transmission information can be represented by a specific vector shown in the following equation 2.

$$s = [s_1, s_2, \ldots, s_{N_T}]^T \quad \text{[Equation 2]}$$

Individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, ŝ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector ŝ having an adjusted transmission power is applied to a weight matrix W, so that NT transmission signals $x_1, x_2, \ldots, x_{N_T}$ to be actually transmitted are configured. In this case, the weight matrix w is adapted to properly distribute transmission information to individual antennas according to transmission channel situations. The above-mentioned transmission signals $x_1, x_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight corresponding to i-th Tx antenna and j-th information. w represents a weight matrix or precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a jth Tx antenna and an ith Rx antenna may be represented as hij. It is to be noted herein that the index of the Rx antenna precedes that of the Tx antenna in hij.

FIG. 5(b) illustrates channels from NT Tx antennas to an ith Rx antenna. The channels may be represented as vectors and matrices by grouping them. As illustrated in FIG. 5(b), the channels from the NT Tx antennas to an ith Rx antenna may be expressed as follows.

$$h_i^T = [h_{i1}, h_{i2}, \ldots, h_{iN_T}] \quad \text{[Equation 7]}$$

Also, all channels from the NT Tx antennas to the NR Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ह_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the NR Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, NR and the number of columns is identical to that of Tx antennas, NT. Thus, the channel matrix H is of size NR*NT.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-valuedecomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
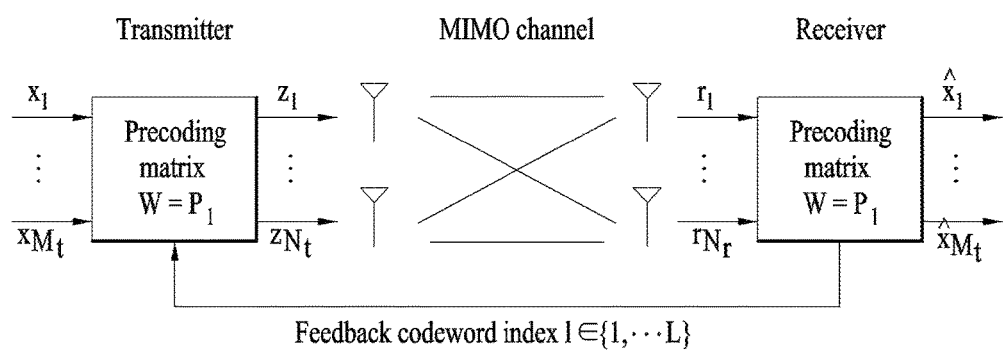
FIG. 6 describes a codebook based beamforming.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |

TABLE 6-continued

| Codebook index | $u_n$ | Number of layers υ | | | |
|---|---|---|---|---|---|
| | | 1 | 2 | 3 | 4 |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Configuration of Multiple Antennas

Figure 7:
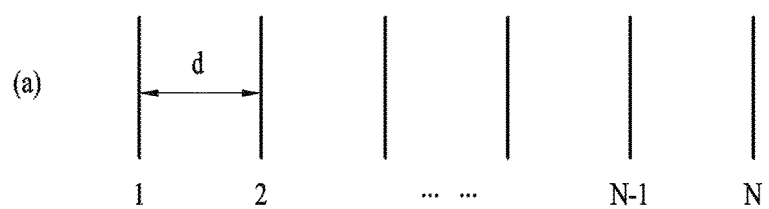
FIG. 7 shows an example of a configuration of 8Tx transmitting antenna.
Figure 7:
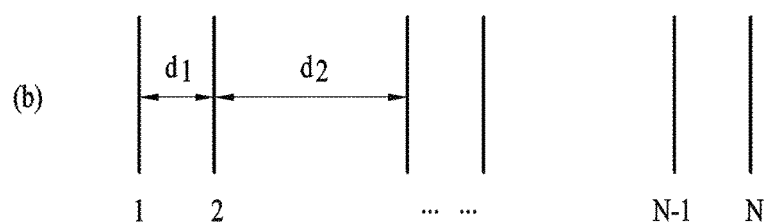
Figure 7:
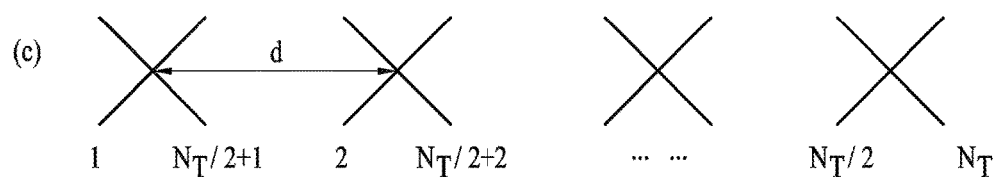

FIG. 7 illustrates configuration of 8 transmit (Tx) antennas.

FIG. 7(a) illustrates a case where N antennas constitute independent channels without being grouped. This antenna array is typically called a uniform linear array (ULA). When the number of antennas is small, the ULA configuration may be used. However, if the number of antennas is large, space for the transmitter and/or receiver may not be sufficient to spatially separate and dispose the multiple antennas to configure independent channels.

FIG. 7(b) illustrates a paired ULA configured by pairing every two antennas. In this case, an associated channel may be shared by a pair of two channels and be independent from the channels of other pairs of channels.

In contrast with legacy 3GPP LTE Release-8/9, which employs 4 Tx antennas for downlink, 3GPP LTE Release-10 or later systems may employ 8 Tx antennas for downlink. To use such extended antenna configuration, multiple Tx antennas need to be installed in an insufficient space, and accordingly the ULA antenna configuration as shown in FIGS. 7(a) and 7(b) may not be appropriate. Accordingly, a dual-pole (or cross-pole or cross polarization) antenna configuration as shown in FIG. 7(c) may be applied. If Tx antennas are configured in this way, independent channels may be configured by lowering correlation of antennas even if the distance d between the antennas is relatively short, and therefore data transmission with high throughput may be possible.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W = W_1 * W_2$ or $W = W_2 * W_1$. Accordingly, in LTE-A, the CSI may include RI, $W_1$, $W_2$ and CQI.

In the 3GPP LTE(-A) system, an uplink channel used for CSI transmission is configured as shown in Table 7.

TABLE 7

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

|  |  | PMI Feedback Type | | |
|---|---|---|---|---|
|  |  | No PMI | Single PMI | Multiple PMIs |
| PUSCH CQI Feedback Type | Wideband (Wideband CQI) |  |  | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
|  | UE selected (Subband CQI) | Mode 2-0 RI (only for Open-loop SM) 1st wideband CQI(4 bit) + Best-M CQI(2 bit) (Best-M CQI: An average CQI for M SB(s) selected from among N SBs) Best-M index (L bit) |  | Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
|  | Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

Figure 9:
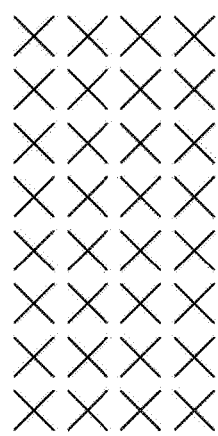
FIG. 9 shows a 2D antenna array configured with cross-polarized (X-pol) antennas.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

In the present specification, proposed is a method of determining a priority and drop scheme between channel information on transmitting feedbacks for two or more CSI estimations, and a corresponding single CSI feedback chain design scheme and then transmitting them.

Figure 8:
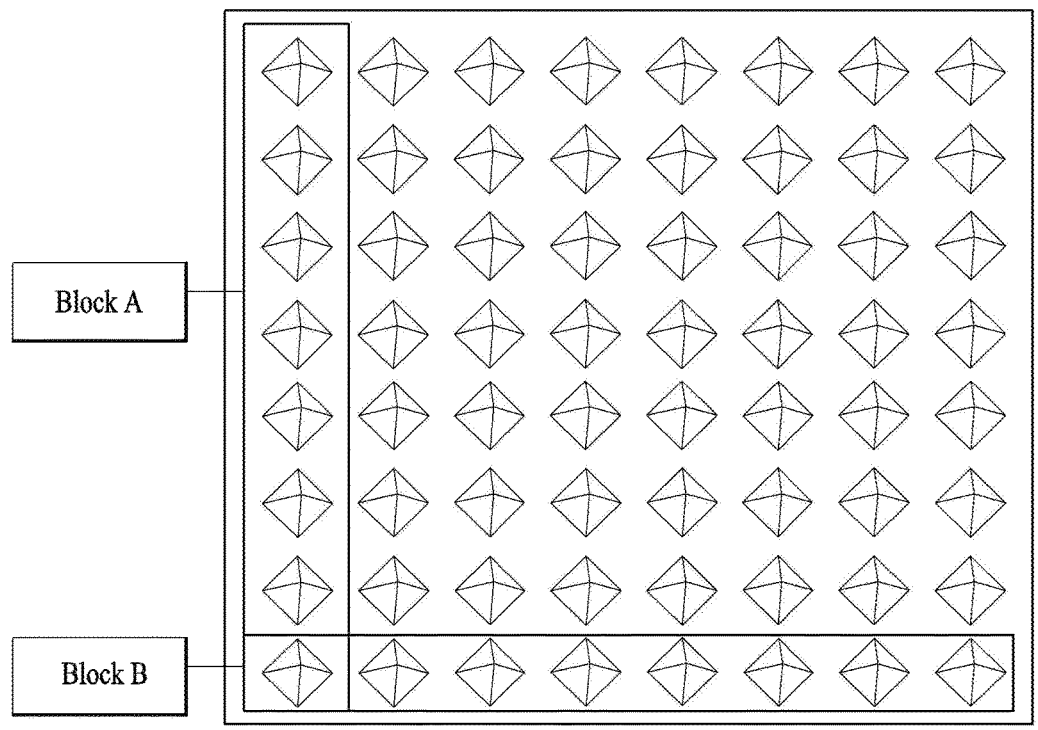
FIG. 8 shows one example of 2D (2-dimensional) antenna array.

After LTE Rel-12, an AAS (active antenna system) utilized antenna system is going to be introduced. Since each antenna of AAS includes an active antenna having an active circuit, the AAS is expected as a technology more efficiently applicable in reducing interference or performing a beamforming by modifying an antenna pattern to meet a situation. If such AAS is established 2-dimensionally [i.e., 2D-AAS], a transmitted beam can be changed more aggressively according to a location of a receiving end by 3-dimensionally adjusting a main lobe of an antenna in more efficiently in aspect of an antenna pattern. Such a 2D-AAS is expected to establish a massive antenna system by deploying antennas, as shown in FIG. 8, in vertical and horizontal directions.

In case of introducing such 2D-AAS, in order to inform a receiving end of a channel from a transmitting end to the receiving end, the transmitting end may transmit a specific RS (e.g., CSI-RS (channel state information-reference signal) (hereinafter, named 'CSI-RS' for clarity). In a current LTE system, such CSI-RS is designed into 1-port, 2-port, 4-port, or 8-port CSI-RS. Each n-port CSI-RS should use n Res for 1 RB, where n>1. Hence, in case of 2D-AAS, as there are 8 antennas in a vertical direction and 8 antennas in a horizontal direction, if total 64 antenna ports are provided, 64 REs in 1 RB should be used for CSI-RS according to an existing scheme. Hence, CSI-RS overhead attributed to the number of antennas may cause a problem.

Recently, in order to solve such a problem, proposed is a method of even inferring channels received at the rest of ports using some of SCI-RS ports only. To this end, there are various methods. Yet, according to the present invention, assume a situation of estimating a channel from 2D-AAS to a receiving end by Kronecker product as follows.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix}$$ [Formula 12]

In the above formula, ⊗ means a kronecker product operation.

In the above formula, H means a whole channel from a transmitting end to a receiving end, and $H_T^{(j)}$ means a channel from the transmitting end to a jth receiving antenna. $H_V^{(j)}$ and $H_H^{(j)}$ mean channels transmitted from antenna ports (or antenna elements) in vertical and horizontal directions to the jth antenna, respectively. In FIG. 8, $H_V^{(j)}$ means a channel from an antenna of Block A to jth antenna of the receiving end on the assumption that the antenna of the Block A exists only, and $H_H^{(j)}$ means a channel from an antenna of Block B to jth antenna of the receiving end on the assumption that the antenna of the Block B exists only. For clarity, the following description is made in aspect of a random single receiving antenna, and all processes are applicable to other receiving antennas. The following description is made using a channel from the transmitting end to a random single receiving antenna from which an index (j) is eliminated.

$$H_T = H_V \otimes H_H$$ [Formula 13]

Formula 13 is the formula for the description of the present invention, and a real channel may not correspond to Formula 13.

For CSI-RS, a first CSI-RS transmitted from $N_V$ antenna ports in vertical direction like the Block A shown in FIG. 8 and a second CSI-RS transmitted from $N_H$ antenna ports in horizontal direction like the Block B are configured, whereby total 2 CSI-RSs can be configured. Having measured the 2 CSI-RSs, the receiving end may infer a channel using a kronecker product of 2 channel matrixes like Formula 2. Herein, $N_V$ indicates the number of antennas in vertical direction and $N_H$ indicates the number of antennas in horizontal direction. Through this, it is advantageous in informing the receiving end of channels transmitted from 64 ports with the existing 2-, 4- and 8-port CSI-RSs only.

Instead of a same cross-polarized array shown in FIG. 9, it may consider using a cross-polarized antenna array (hereinafter abbreviated X-pol AA) shown in FIG. 9. In this case, a 64-port antenna array may be configured with 8 rows and 2 columns and 2 cross polarization characteristics.

Figure 10:
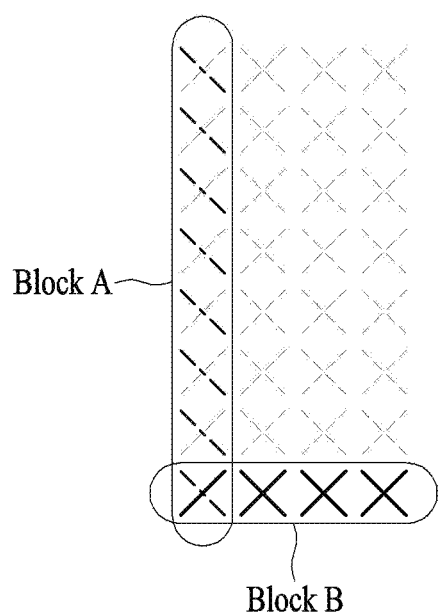
FIG. 10 shows a block selection in a 2D antenna array configured with cross-polarized (X-pol) antennas.

FIG. 10 shows an example of Block A/B in X-pol AA. Herein, the Block A and the Block B differ from each other in codebook properties.

For example, according to the example shown in FIG. 10, the Block B is an X-pol antenna array. If a polarization considered codebook is used, it helps the performance enhancement. In this case, a current LTE-A 8tx codebook is available.

Yet, the Block A has the property like ULA. In this case, it is advantageous to use a DFT codebook. An example of a corresponding 3D codebook is shown as follows.

$$W_V \otimes W_H(W1_V e_V) \otimes \begin{bmatrix} W1_H & 0 \\ 0 & W1_H \end{bmatrix} \begin{bmatrix} e_H \\ \alpha e_H \end{bmatrix}$$ [Formula 14]

In the above codebook, ⊗ means a Kronecker product operation.

In the codebook, $W1_V$ means a precoding set of vertical antenna elements. $e_V$ plays a role in selecting one from the precoding set. Hence, $W1_V$ is fed back in long term, and $e_V$ is fed back in short term having a period shorter than that of $W1_V$.

$W1_V$ is selected as a subset of a matrix D consisting of columns in a DFT codebook D matrix.

Meanwhile, the DFT codebook can be prepared as follows. In the following DFT codebook, α is an oversampling factor and $N_V$ is the number of vertical antenna elements.

$$D_{(mn)}^{N_V \times N_V a} = \frac{1}{\sqrt{N_V}} e^{j\frac{2\pi(m-1)(n-1)}{N_V a}}$$ [Formula 15]

Herein, m=1, 2 ... $N_V$, and n=1, 2 ... $N_V$a.

$e_V$ is a selection vector and plays a role in selecting a column from $W1_V$. $e_V$ consists of 1 vector, a value of one of elements has a value '1', and the rest of values have a value '0' each. For example, if $e_V$ has a second element set to '1' and also has the rest of elements set to '0, a second column of $W1_V$ is selected.

In the codebook of Formula 14, $W_H$ means a precoding set of horizontal antenna elements. There is a configuration of $W_H=W1_H \cdot W2_H$, and $W2_H$ consists of $e_H$ and α. Hence, $W1_H$ is fed back in long term, and $W2_H$ is fed back in short term having a period shorter than that of $W1_H$.

In the above example, horizontal PMIs $W1_H$ and $W2_H$ and vertical PMIs $W1_V$ and $e_V$ have different characteristics. Thus, in case of kronecker channel estimation using two or more CSI feedback chains, individual channel information may differ in characteristic. Hence, in case that a transmission instance (or timing) of each individual channel information overlaps, it may cause a problem of determining what kind of information will be dropped. In the following description, for clarity, $W2_V$ more general than $e_V$ shall be used as a notation for a short-term vertical precoding.

For the horizontal and vertical channel state information transmission, at least two CSI processes are required. In this case, if different channel informations are transmitted at the same transmission instance, a priority between individual channel informations is important to determine the information to drop. The priority between individual channel informations means a reference for determination on which information will be dropped if transmission periods of at least two individual channel informations overlap with each other at the same transmission instance. For example, regarding priorities in the current LTE-A, in case of collision of a CSI report with PUCCH reporting type 3, 5, or 6 of one serving cell with a CSI report with PUCCH reporting type 1, 1a, 2, 2a, 2b, 2c, or 4 of the same serving cell, the latter CSI report with PUCCH reporting type (1, 1a, 2, 2a, 2b, 2c, or 4) has lower priority and is dropped.

Herein, the PUCCH reporting types are described as follows.

Type 3: RI
Type 5: RI+WB W1
Type 6: RI+PTI
Type 1: SB (sub-band) CQI
Type 2: WB (wideband) CQI+WB PMI
Type 4: WB CQI
Type 1a: SB CQI+SB W2
Type 2b: WB CQI+WB W2
Type 2c: WB W1+WB W2+WB CQI
Type 2a: WB W1

Namely, long term feedback has a priority higher than that of short term feedback.

In Horizontal/Vertical feedback structure, channel information and characteristic supposed to be reported are described as follows.

1. Rank
1-a. Separate transmissions of Horizontal RI (HRI) and Vertical RI(VRI)
1-b. Joint RI transmission of HRI and VRI
2. CQI
Joint CQI transmission for a channel for a horizontal antenna element and a vertical antenna element
3. PMI
Separate transmissions of Horizontal PMI (HPMI) and Vertical PMI (VPMI)

When RI uses a joint RI index instead of HRI and VRI, in case of a transmission with RI=4, since it is unable to distinguish HRI=2 & VRI=2 from HRI=4 & VRI=1, mapping to a table of a joint encoding type like the following table is preferable.

TABLE 10

| Joint RI index | Horizontal rank | Vertical rank |
|---|---|---|
| 0 | 1 | 1 |
| 1 | 2 | 1 |
| 2 | 3 | 1 |
| 3 | 4 | 1 |
| 4 | 5 | 1 |
| 5 | 6 | 1 |
| 6 | 7 | 1 |
| 7 | 8 | 1 |
| 8 | 1 | 2 |
| 9 | 2 | 2 |
| 10 | 3 | 2 |
| 11 | 4 | 2 |
| 12 | 5 | 2 |
| 13 | 6 | 2 |
| 14 | 7 | 2 |
| 15 | 8 | 2 |

Table 10 is one example of a joint RI index when a maximum horizontal rank and a maximum vertical rank are 8 and 2, respectively. Besides, joint RIs reflecting various characteristics (e.g., HRI≥VRI, Maximum RI=8) may be available.

A channel (hereinafter named 'horizontal channel') according to a horizontal antenna element and a channel (hereinafter named 'vertical channel') according to a vertical antenna element may differ from each other in characteristics. For example, a vertical channel may be determined as having a characteristic changing speed slower than that of a horizontal channel. In this case, a feedback period of information on the vertical channel may be longer than that of information on the horizontal channel, whereby a priority of VPMI may be different from that of HPMI.

Moreover, the number of bits required for transmitting each individual channel information may be different. Particularly, if the bit number for transmitting a specific channel information is sufficiently small, the corresponding information may be transmitted by jointing with another information (e.g., by joint coding). For example, $e_V$ of Formula 14 is transmittable with 2 bits only unlike $W1_V$ or $W2_H = \alpha e_H$, and can be transmitted with another PMI (e.g., $W1_H$). Thus, if two or more different individual channel state informations differing from each other in priority are transmitted by jointing with each other, a priority of the joint channel state information may be determined as a higher one of the priorities of the two channel informations. A priority of the joint channel state information may be determined as a lower r one of the priorities of the two channel informations, and such a specific priority determination reference may exist.

Like the above example, a CSI report on a horizontal channel and a CSI report on a vertical channel belong to different CSI feedback chains, respectively, although a channel information to be reported is classified into a long term channel information or a short term channel information, the channel information to be reported may have a different priority in the long term channel information or the short term channel information. For example, $1^{st}$ priority: VRI,
$2^{nd}$ priority: HRI, $W1_V$, $W2_V$
$3^{rd}$ priority: CQI, $W1_H$, $W2_H$ The above example relates to a method of dividing a level of priority between channel informations when 3 priority levels are applied instead of 2 priority levels corresponding to an existing long/short term feedback. In this case, actually applied examples shown in the following table may be made.

TABLE 11

| Priority level | Example 1 | Example 2 | Example 3 |
|---|---|---|---|
| Level 3 | VRI | VRI | Joint RI index |
| Level 2 | HRI + $W1_H$, $W1_V$, $W2_V$ | HRI + PTI, $W1_V$ | $W1_V$ + $W1_H$, $W2_V$ |
| Level 1 | CQI + $W2_H$ | CQI, $W2_V$ + $W1_H$, $W2_H$ | CQI, $W2_H$ |

In case of Example 1 shown in Table 11, a priority of '$HRI+W1_H$' is determined into a priority of HRI having a priority higher than that of $W1_H$. In the same manner, $W1_H$ of Example 3 is also determined into Level 2 of a priority together with $W1_V$.

Figure 11:
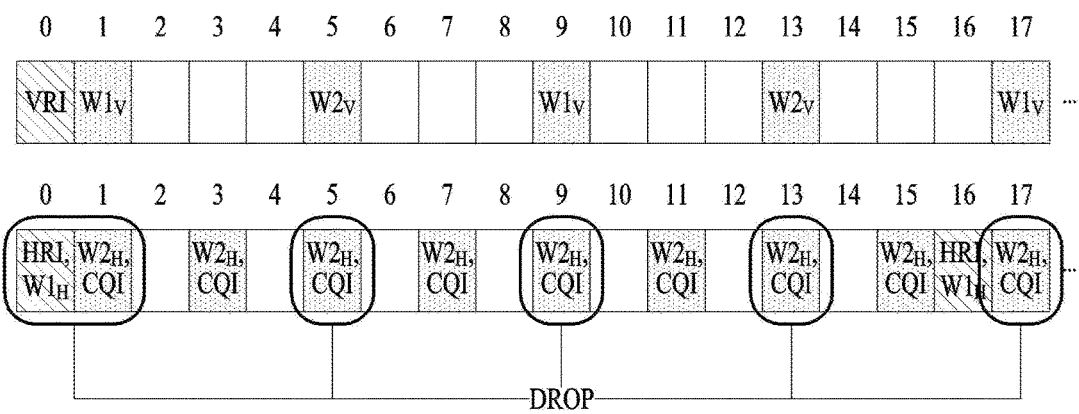
FIG. 11 shows 2 channel state reporting chains corresponding to a vertical antenna block and a horizontal antenna block, respectively.

If Example 1 shown in Table 11 is diagrammatized, as shown in FIG. 11, channel information will be dropped.

Although channel state information uses 3 priority levels adjacent to each other according to the able example, a method of three or more priority levels possibly spaced apart from each other is available for an actual use. Moreover, a priority level equal to or lower than a priority level 0 may be allowable.

In the example shown in FIG. 11, a CSI feedback chain for a horizontal channel uses a feedback mode 1-1 and a sub-mode A and a vertical CSI feedback chain for a vertical channel uses a feedback mode failing to feed back a CQI. Thus, if at least two CSI feedback chains are used and an joint CQI for each chain is transmitted, a sort of 'feedback mode 0-x' may be used for a feedback chain failing to transmit CQI. This feedback mode is implemented into type 2a/2a & 3/5/2a & 5 depending on a presence or non-presence of transmission of VRI (or a presence or non-presence of transmission of an joint RI) and a presence or non-presence of a use of a dual codebook, and may be used by depending on a prescribed different feedback chain that transmits CQI.

Moreover, when a CQI reported per report transmission instance of each CQI is calculated, it may be defined or configured to calculate a CQI on the assumption that of at least one individual channel state information among {VRI, HRI, $W1_V$, $W1_H$, $W2_V$, $W2_H$} reported latest before a timing point corresponding to a reference resource for calculating a corresponding CQI report or a CQI to be reported. For example, if all of {VRI, HRI, $W1_V$, $W1_H$, $W2_V$, $W2_H$} should be assumed, CQI is calculated in a state that each individual channel state information reported latest without being dropped according to the reference related to the CSI report collision.

If a specific one of the individual channel state informations is derived by assuming a latest reported value of another individual channel state information (e.g., W1_V based on latest reported VRI, W2_V based on latest reported W1_V, W1_H based on latest reported HRI, W2_H based on latest reported W1_H), it may be defined or configured to determine the latest reported value according to a preceding or following (sorted by the priority level) relation. Namely, although it is necessary to assume the latest reported value for at least one of {VRI, HRI, $W1_V$, $W1_H$, $W2_V$, $W2_H$}, for example, if a timing point ($T_{W2\_V}$) of the latest reported $W2_V$ precedes a timing point ($T_{W1\_V}$) of the latest reported $W1_V$ before the CQI report timing point, the CQI may be calculated by finding and assuming a latest (or recent) $W1_V$ among the timing points further behind the timing point ($T_{W2\_V}$) instead of assuming W1V of the timing point ($T_{W1\_V}$). This is described again according to the concept of the priority level as follows. First of all, when a specific priority level in the example shown in Table 11 is given, a corresponding individual channel state information (e.g., CQI) to be reported at a reporting timing point of a low priority level is calculated by assuming a latest reported individual channel state information (e.g., $W2_H$, {HRI+$W1_H$, $W1_V$, $W2_V$}, VRI) of a priority level equal to and/or higher than that of the corresponding individual channel state information, and a specific individual channel state information (e.g., $W2_V$) among the latest reported individual channel state informations is calculated by assuming a latest reported individual channel state information (e.g., $W_V$, VRI) of a priority level equal to and/or higher than that of the specific individual channel state information. Moreover, a specific individual channel state information (e.g., $W2_H$) among the latest reported individual channel state informations is calculated by assuming a latest reported individual channel state information (e.g., $W1_H$, HRI) of a priority level equal to and/or higher than that of the specific individual channel state information. And, a specific individual channel state information (e.g., $W1_V$) among the latest reported individual channel state informations is calculated by assuming a latest reported individual channel state information (e.g., VRI) of a priority level equal to and/or higher than that of the specific individual channel state information. Moreover, a specific individual channel state information (e.g., $W1_H$) among the latest reported individual channel state informations is calculated by assuming a latest reported individual channel state information (e.g., $W1_V$, HRI) of a priority level equal to and/or higher than that of the specific individual channel state information.

As described through such example, it is apparent that an embodiment regarding how to assume a latest reported value recognized through a prescribed reporting timing can vary depending on how to define/configure a priority level shown in Table 11.

Since such a priority is affected by several factors, when two or more CSI feedback chains are used, it may be difficult to determine the priority in advance. For example, in case of using 1 additional horizontal CSI-RS for two CSI feedback chains, priorities of total 4 levels are usable. And, CSI feedback for 2 horizontal CSI-RSs may be set to use the same priority level using maximum 3 priority levels. Hence, a base station transmits a corresponding priority level assignment information through RRC or the like, and a UE can feed back horizontal/vertical channel information according to the received priority level assignment information. Or, the base station transmits the priority level assignment information to the UE, and the UE may interpret channel information according to the priority level assignment information from the base station.

Like CoMP (Coordinated Multiple transmission and reception point) or CA (Carrier Aggregation), the same reference is applicable to a case that another CSI feedback chain is additionally assigned to the two CSI feedback chains shown in the above example. For example, assuming that a CSI feedback chain 2, which uses 8tx feedback mode 1-1 and sub-mode 1, is assigned in addition to the CSI feedback chains 1V and 1H of Example 1 shown in Table 11, priority of channel information transmitted on the CSI feedback chain 2 can be summarized as the following table.

TABLE 12

| Priority level | feedback chain 2 |
| --- | --- |
| Level 2 | HRI + W1 |
| Level 1 | CQI + W2 |

A priority level is summarized per CSI feedback chain and individual channel state information is summarized using the priority level shown in Table 12 as follows.

TABLE 13

| Priority level | feedback chain 1V, 1H | feedback chain 2 |
| --- | --- | --- |
| Level 3 | $VRI_1$ | |
| Level 2 | $HRI_1 + W1_{H_1}, W1_{V_1}$ | $HRI_2 + W1_2$ |
| Level 1 | $CQI_1 + W2_{H_1}, W2_{V_1}$ | $CQI_2 + W2_2$ |

In the current LTE-A, in case that two or more channel information reports or transmissions overlap with each other in an instance for CSI report, what kind of channel information will be transmitted is determined by the following steps.

a) Priority of CSI reporting type
b) CSI process index (Low CSI process index indicates high priority)
c) CC index (Low CC index indicates high priority)
d) Restricted measurement set index (Low restricted measurement set index indicates high priority)

Hence, a priority of channel information in a situation of a multi-CSI feedback process of CoMP/CA may be determined, after a) comparing priority levels of CSI reporting types based on the priority levels shown in Table 13, in b) order of comparing CSI process indexes, comparing CC indexes having the same priority, and then comparing restricted measurement set indexes for the same CC index, with respect to the CSI reporting type having the same priority.

When the base station configures total 2 CSI processes including CSI process 1 for a vertical channel and CSI process 2 for a horizontal channel, the base station sets an index of the CSI process 1 to be always lower than that of the CSI process 2, thereby giving a higher priority to a feedback for the vertical channel in case of collision of CSI reporting types having the same priority. Of course, on the contrary, it is possible for the base station to set the index of the CSI process 2 to be always higher. To this end, the UE expects that the base station will set the index of the CSI process 1 to be lower than that of the CSI process 2.

The above priorities between channel information contents are applicable to a case that the two CSI feedback chains of the above example collide with an existing Rel-8 feedback chain. For example, assuming that a CSI feedback chain 3, which uses 2tx mode 1-1, is assigned in addition to the CSI feedback chains 1V and 1H of Example 1 shown in Table 11, priority of channel information transmitted on the CSI feedback chain 3 can be summarized as the following table.

TABLE 14

| Priority level | feedback chain 3 |
| --- | --- |
| Level 2 | HRI |
| Level 1 | CQI + W |

A priority level is summarized per CSI feedback chain and channel information content is summarized using the priority level shown in the above table as follows.

TABLE 15

| Priority level | feedback chain 1V, 1H | feedback chain 2 |
| --- | --- | --- |
| Level 3 | $VRI_1$ | |
| Level 2 | $HRI_1 + W1_{H_1}, W1_{V_1}$ | $HRI_3$ |
| Level 1 | $CQI_1 + W2_{H_1}, W2_{V_1}$ | $CQI_3 + W_3$ |

Hence, as mentioned in the foregoing description, it is able to determine whether to report or drop each individual channel state information by the sequential comparison procedures according to a) to d).

Meanwhile, as a result of the sequential comparison procedure according to a) to d), it may not be able to determine whether to report or drop each individual channel state information. Namely, 2 individual channel state informations may have the same priority or index according to a) to d). In this case, a user equipment may transmit the 2 individual channel state informations by performing joint encoding on the 2 individual channel state informations.

Unlike the aforementioned embodiment, i.e., instead of using at least 2 CSI feedback chains for the horizontal and vertical channel state information transmission, a scheme of feeding back individual channel state informations on two or more CSI processes by joint through 1 CSI feedback chain may be taken into consideration. Or, a scheme of reporting all CSI feedback contents desired to be fed back through two or more CSI processes through a single CSI feedback chain on a single CSI process configuration may be taken into consideration. Since such a use of the single CSI feedback chain may be preferable in aspect of optimization of feedback design, a single CSI feedback chain may be newly designed and configured for a user equipment with such intention. In doing so, when the corresponding CSI feedback chain is designed, the above-described priority levels are applicable.

It is able to design a feedback mode by defining channel information required for feedback for 3D-MIMO and setting information transmission period and offset for each channel information. Examples of the transmission period and offset for Example 1 shown in Table 11 are shown in the following table. Particularly, the following table shows an example of determining CSI reporting instances by providing transmission periods/offsets of horizontal channel information and vertical channel information as completely separate RRC parameters.

TABLE 16

| CSI index | Priority level | CSI | Parameters | Period (subframe) | Offset (subframe) |
| --- | --- | --- | --- | --- | --- |
| 1 | Level 1 | $W2_V$ | $N_{Pd, V} = 4$, $N_{Offset, W, V} = 0$ | 4 | 0 |
| 2 | Level 1 | CQI + $W2_H$ | $N_{Pd, H} = 4$, $N_{Offset, CQI} = 2$ | 4 | 2 |
| 3 | Level 2 | $W1_V$ | $H'_V = 2$ | $H'_V \times N_{Pd, V} = 8$ | $N_{Offset, W, V} = 0$ |
| 4 | Level 2 | HRI + $W1_H$ | $M_{RI, H} = 2$, $N_{Offset, RI, H} = 2$ | $M_{RI, H} \times N_{Pd, H} = 8$ | $N_{Offset, CQI} + N_{Offset, RI, H} = 4$ |
| 5 | Level 3 | VRI | $M_{RI, V} = 8$, $N_{Offset, RI, V} = 0$ | $M_{RI, V} \times N_{Pd, V} = 32$ | $N_{Offset, W, V} = 0$ |

Namely, the above table shows that types of parameters provided to a user equipment through upper layer signaling include $N_{Pd,V}$, $N_{Pd,H}$, $H'_V$, $M_{RI,H}$, $M_{RI,V}$, $N_{Offset,W,V}$, $N_{Offset,CQI}$, $N_{Offset,RI,H}$, and $N_{Offset,RI,V}$.

In this case, parameters such as $N_{Pd,H}$, $M_{RI,H}$, $N_{Offset,CQI}$, $N_{Offset,RI,H}$ and the like may be separately RRC signaled for such 3D-MIMO feedback operation of the present invention, or may be RRC signaled by a base station by intactly reusing the existing RRC parameters $N_{Pd}$, $M_{RI}$, $N_{Offset,CQI}$, $N_{Offset,RI}$ and the like. And, it is able to define/configure that the user equipment re-interprets and applies the existing parameters for the operations proposed by the present invention. For clarity, in the following description, such notations are $N_{Pd,H}$, $M_{RI,H}$, $N_{Offset,CQI}$, $N_{Offset,RI,H}$ and the like are used.

If a transmission instance of each channel information according to the RRC parameters satisfies the following formulas, it is determined as a transmission instance of the corresponding information.

TABLE 17

| CSI | Formula |
| --- | --- |
| $W2_V$ | $(10 \times n_f + \lfloor n_s/2 \rfloor - N_{OFFSET, W, V}) \bmod (N_{pd, V}) = 0$ |
| CQI + $W2_H$ | $(10 \times n_f + \lfloor n_s/2 \rfloor - N_{OFFSET, CQI}) \bmod (N_{pd, H}) = 0$ |
| $W1_V$ | $(10 \times n_f + \lfloor n_s/2 \rfloor - N_{OFFSET, W, V}) \bmod (N_{pd, V} \cdot H'_V) = 0$ |
| HRI + $W1_H$ | $(10 \times n_f + \lfloor n_s/2 \rfloor - N_{OFFSET, CQI} - N_{OFFSET, RI, H}) \bmod (N_{pd, H} \cdot M_{RI, H}) = 0$ |
| VRI | $(10 \times n_f + \lfloor n_s/2 \rfloor - N_{OFFSET, W, V} - N_{OFFSET, RI, V}) \bmod (N_{pd, V} \cdot M_{RI, V}) = 0$ |

According to the priority levels shown in Table 16, it may be determined what kind of channel information will be transmitted in a subframe where transmission instances of different channel informations overlap with each other.

Due to some reasons, two or more channel information transmission instances having the same priority level may overlap. In this case, an additional priority level is temporarily applied according to a predetermined reference as well as the above priority levels. For example, if a transmission instance of a vertical channel information and a transmission instance of a horizontal channel information overlap with each other, a priority level of the horizontal channel information may be regarded as higher. If the above situation occurs, the UE regards that a collision between transmission period/offset related parameters for the priority level and/or channel information has occurred in the base station and is then able to inform the base station of a presence or non-presence of the corresponding collision through RRC signaling or the like.

Figure 12:
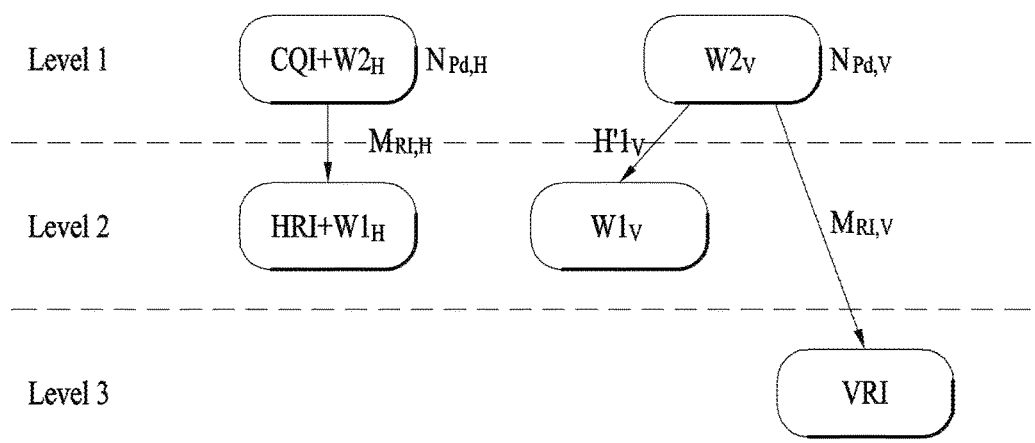
FIG. 12 shows a priority between individual informations of a channel state reporting.

According to the above example, a dependency relationship of a transmission period between channel information contents is shown in FIG. 12.

Figure 13:
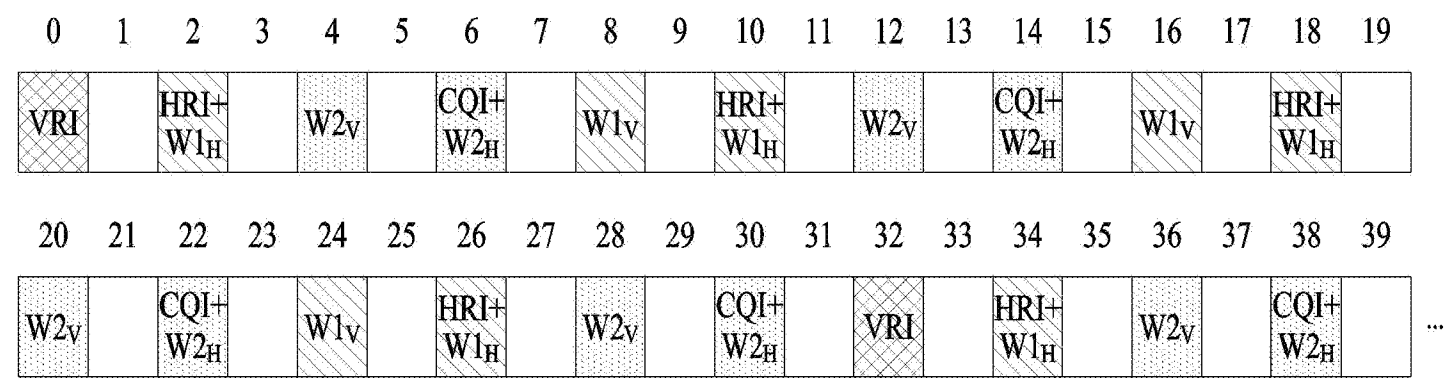

FIG. 13 shows a channel state information content to be transmitted in a transmission instance of a CSI feedback chain according to Table 17.

Unlike the example shown in Table 16, a dependency relationship between vertical and horizontal channel informations may be defined. For example, a transmission period of $W2_V$ can be defined as $H'2_V$ times greater than a CQI transmission period. According to such dependency relationship, transmission periods of the vertical and horizontal channel informations are mutually related and a priority level is determined with reference to a size of the transmission period. In case that transmission instances of at least 2 channel informations overlap with each other, a reporting can be performed according to the priority level.

TABLE 18

| CSI index | Priority level | CSI | Parameters | Period (subframe) | Offset (subframe) |
|---|---|---|---|---|---|
| 1 | Level 1 | $W2_V$ | $H'2_V = 1$, $N_{Offset, W, V} = 0$ | $N_{Pd, H} \times H'2_V = 4$ | 0 |
| 2 | Level 1 | CQI + $W2_H$ | $N_{Pd, H} = 4$, $N_{Offset, CQI} = 2$ | 4 | 2 |
| 3 | Level 2 | $W1_V$ | $H'1_V = 2$ | $H'1_V \times N_{Pd, H} \times H'2_V = 8$ | $N_{Offset, W, V} = 0$ |
| 4 | Level 2 | HRI + $W1_H$ | $M_{RI, H} = 2$, $N_{Offset, RI, H} = 2$ | $M_{RI, H} \times N_{Pd, H} = 8$ | $N_{Offset, RI, H} + N_{Offset, CQI} = 4$ |
| 5 | Level 3 | VRI | $M_{RI, V} = 8$, $N_{Offset, RI, V} = 0$ | $M_{RI, V} \times N_{Pd, H} \times H'2_V = 32$ | $N_{Offset, W, V} + N_{Offset, RI, V} = 0$ |

If a transmission instance of each channel state content meets the following formula, it is determined as a transmission instance of a corresponding channel state content.

TABLE 19

| CSI | Formula |
|---|---|
| $W2_V$ | $(10 \times n_f + \lfloor n_s/2 \rfloor - N_{OFFSET, W, V}) \mod(N_{pd, H} \cdot H'2_V) = 0$ |
| CQI + $W2_H$ | $(10 \times n_f + \lfloor n_s/2 \rfloor - N_{OFFSET, CQI}) \mod(N_{pd, H}) = 0$ |
| $W1_V$ | $(10 \times n_f + \lfloor n_s/2 \rfloor - N_{OFFSET, W, V}) \mod(N_{pd, H} \cdot H'2_V \cdot H'1_V) = 0$ |
| HRI + $W1_H$ | $(10 \times n_f + \lfloor n_s/2 \rfloor - N_{OFFSET, CQI} - N_{OFFSET, RI, H}) \mod(N_{pd, H} \cdot M_{RI, H}) = 0$ |

TABLE 19-continued

| CSI | Formula |
|---|---|
| VRI | $(10 \times n_f + \lfloor n_s/2 \rfloor - N_{OFFSET, W, V} - N_{OFFSET, RI, V}) \mod(N_{pd, H} \cdot H'2_V \cdot M_{RI, V}) = 0$ |

Figure 14:
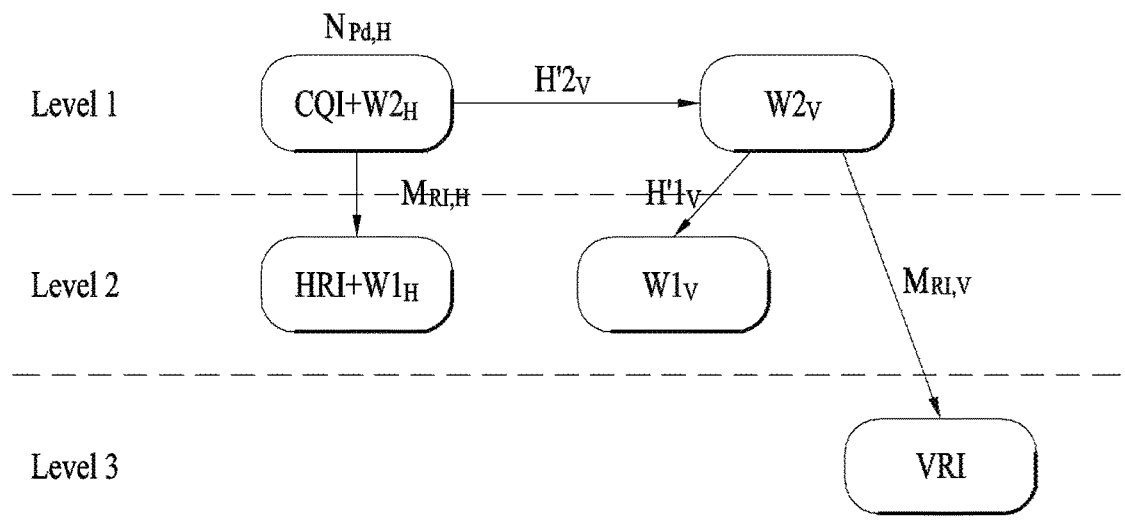
FIG. 14 shows a priority between individual informations of a channel state reporting.

According to the above example, a dependency relationship of a transmission period between channel information contents is shown in FIG. 14.

In some cases, the transmitted RRC parameters may vary unlike the above example.

Offset information of specific channel information may not be indicated. This case takes an action as if offset=0 is transmitted in the above example.

A precoding of a prescribed side may include a single codebook instead of a dual codebook. In this case, a parameter $H'_V$ of a corresponding feedback chain may not be provided through upper layer signaling of RRC or the like.

A specific channel information content may be transmitted by being jointly encoded with other channel information contents. In this case, a transmission period/offset information on the corresponding content may not be transmitted. For example, in case of transmitting a joint RI index instead of HRI/VRI, it is able to transmit transmission period/offset information on the joint RI index such as $M_{RI,Joint}$ & $N_{Offset,RI,Joint}$ instead of $M_{RI,H}$ & $N_{Offset,RI,H}$ for HRI and $M_{RI,V}$ & $N_{Offset,RI,V}$ for VRI.

Or, as transmission period/offset information on the corresponding joint RI index, the related art $M_{RI,H}$ and $N_{Offset,RI,H}$ can be provided only. Thus, although the related art RRC parameters $M_{RI,H}$ and $N_{Offset,RI,H}$ are provided only, a user equipment operation can be defined/configured such that the user equipment interprets that transmission instances for RI reports determined by the parameters should report HRI and VRI together with the joint RI index.

Two or more channel informations may be independently transmitted or use the same parameter in common. In this case, like the example of the joint index reporting, newly defined common parameters can be transmitted only instead of the respective parameters. Or, as the common parameters, the related art parameters (e.g., at least one of $M_{RI}$, $N_{Offset,RI}$ and $N_{Pd}$, H') can be defined/configured to play a corresponding public role.

Meanwhile, a priority level used in designing a single CSI feedback chain may be different from a priority level for determining a drop between channel information contents when a corresponding CSI feedback chain is simultaneously transmitted with another CSI feedback chain. The following table shows an example of feeding back a subband CQI, where channel information is classified into total 3 steps of priority levels 1 to 3.

TABLE 20

| Priority level | Channel Information |
|---|---|
| Level 3 | VRI + PTI |
| Level 2 | HRI + $W1_H$, $W1_V$, wideband $W2_V$, subband $W2_V$ |
| Level 1 | wideband CQI + wideband $W2_H$, subband CQI + subband $W2_H$ |

A priority level for determining a drop between channel information contents in different CSI feedback chains may be set different from the above table. The following indicates a priority in case of collision between channel information contents of the current 3GPP LTE Rel-12 when only multiple CSI processes are configured for UE with CoMP/CA or the like. Since a transmitting antenna in 3GPP LTE Rel-12 does not have a vertical antenna, a reported CSI in the following is the information corresponding to a horizontal antenna.

1$^{st}$ priority (Reporting type 3, 5, 6, or 2a): RI included reporting, single W1 reporting 2$^{nd}$ priority (Reporting type 2, 2b, 2c, or 4): The rest of reporting except 1$^{st}$ and 3$^{rd}$ priority reportings 3$^{rd}$ priority (Reporting type 1, or 1a): Subband CQI included reporting As 3D MIMO will be supported in the future, if channel state information on a vertical channel is additionally fed back, a priority determining reference in case of collision between channel information contents may be changed as follows.

1$^{st}$ priority: Vertical RI included reporting

2$^{nd}$ priority: RI included reporting, single W1 reporting, vertical PMI included reporting 3$^{rd}$ priority: The rest of reporting except 1$^{st}$, 2$^{nd}$ and 4$^{th}$ priority reporting 4$^{th}$ priority: Subband CQI included reporting Hence, a priority determining reference for the single CSI process may be updated in consideration of Table 20 in a multi-process situation as follows.

TABLE 21

| Priority level | Channel Information |
|---|---|
| Level 3 | VRI + PTI |
| Level 2 | HRI + W1$_H$, W1$_V$, wideband W2$_V$ |
| Level 1 | wideband CQI + wideband W2$_H$ |
| Level 0 | subband W2$_V$, subband CQI + subband W2$_H$ |

Meanwhile, unlike the former description, a precoding for a vertical channel can be performed by a single precoder. Namely, not W1$_V$ and W2$_V$ but W$_V$ can be used. In this case, a transmission priority of W$_V$ may be determined into a priority of W1$_V$ in the aforementioned examples. In addition, the dependency relationship of transmission period between the channel information contents shown in FIG. 14 may be modified. Namely, the transmission period of W$_V$ may have a dependency relationship with a transmission period of individual channel state information (e.g., CQI+W2$_H$) on a horizontal channel, and may also have a dependency relationship with a transmission period of individual channel state information (e.g., VRI) on a vertical channel.

Moreover, CSI information on a vertical channel can be transmitted while an existing CSI feedback chain is maintained. Considering that a size of CSI individual information should fit a payload size, vertical RI, W1$_V$ and W2$_V$ can be transmitted by being jointly encoded as follows.

Vertical RI: Transmitted using the aforementioned joint RI (Refer to Table 10)

PMI can be transmitted by being jointed as follows.

W1$_V$ and W2$_V$: Transmittable by being jointly encoded with WB W1$_H$

In this case, by sub-sampling some of WB W1$_H$, WB W1$_V$ and WB W2$_V$, the number of necessary bits can be reduced.

Alternatively, PMI may be transmitted by being jointed as follows.

W1$_V$: Transmittable by being jointly encoded with RI

W2$_V$: Transmittable by being jointly encoded with WB W1$_H$

Of course, the above method may be usable to transmit CSI for a vertical channel by defining and using a new feedback type. In this case, the feedback type can be configured as follows.

Type 의 x1: WB W1$_H$, WB W1$_V$, WB W2$_V$

In this case, by sub-sampling some of WB W1$_H$, WB W1$_V$ and WB W2$_V$, the number of necessary bits can be reduced.

Type x2: RI+W1$_V$

Type x3: WB W1$_H$+WB W2$_V$

Figure 15:
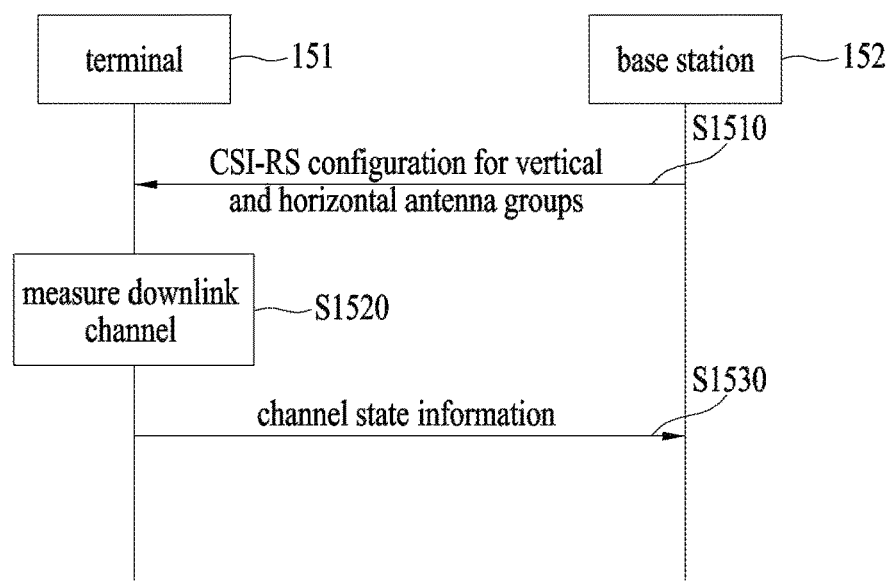
FIG. 15 shows an operation according to one embodiment of the present invention.

FIG. 15 shows an operation according to one embodiment of the present invention.

FIG. 15 shows operations of a user equipment and a base station related to a method for reporting a channel state of a downlink channel transmitted through a 2D array antenna element configured with at least one horizontal direction antenna group and at least one vertical direction antenna group.

A user equipment 151 may receive CSI-RS (channel state information-reference signal) configuration for at least one vertical antenna group and CSI-RS configuration for at least one horizontal antenna group from a base station 152.

The user equipment may measure a DL (downlink) channel using the received CSI-RS configurations [S1520]. Namely, the user equipment may calculate channel state information of the DL channel using the received CSI-RS configurations. Subsequently, the user equipment may transmit the calculated channel state information to the base station [S1530].

The channel state information may include individual channel state informations on a channel (hereinafter named 'vertical channel') of the at least one vertical antenna group and a channel (hereinafter named 'horizontal channel') of the at least one horizontal antenna group, joint of the individual channel state informations, or integrated channel state information of the vertical channel and the horizontal channel, and transmission priorities may be assigned to the above informations, respectively.

If at least two transmission instances of the channel state informations overlap with each other, the rest of the channel state informations may be dropped except the channel state information having the highest transmission priority.

If the transmission priorities of the at least two channel state informations are equal to each other, one channel state information may be dropped according to an addition reference. In this case, the addition reference may be related to a transmission period of the individual channel state information.

The transmission priority may be related to the transmission period of the individual channel state information.

The transmission period of the individual channel state information on the vertical channel may be set to have a specific relation with the transmission period of the individual channel state information on the horizontal channel.

The individual channel state information on the vertical channel may include rank information of the vertical channel, a first precoding information of the vertical channel, and a second precoding information of the vertical channel. The rank information of the vertical channel may have a transmission period greater than that of the first precoding information of the vertical channel, and the first precoding information of the vertical channel may have a transmission period greater than that of the second precoding information of the vertical channel.

The individual channel state information on the horizontal channel may include rank information of the horizontal channel, a first precoding information of the horizontal channel, and a second precoding information of the horizontal channel. The rank information of the horizontal channel may have a transmission period greater than that of the first precoding information of the horizontal channel, and the first precoding information of the horizontal channel may have a transmission period greater than that of the second precoding information of the horizontal channel.

The integrated channel state information of the vertical channel and the horizontal channel may include integrated channel quality information of the vertical channel and the horizontal channel, and the integrated channel quality information may have a transmission period smaller than that of the individual channel state information on the vertical channel and the individual channel state information on the horizontal channel.

And, the joint of the individual channel state informations may be configured to have a highest or lowest transmission priority among the individual channel state informations.

Figure 16:
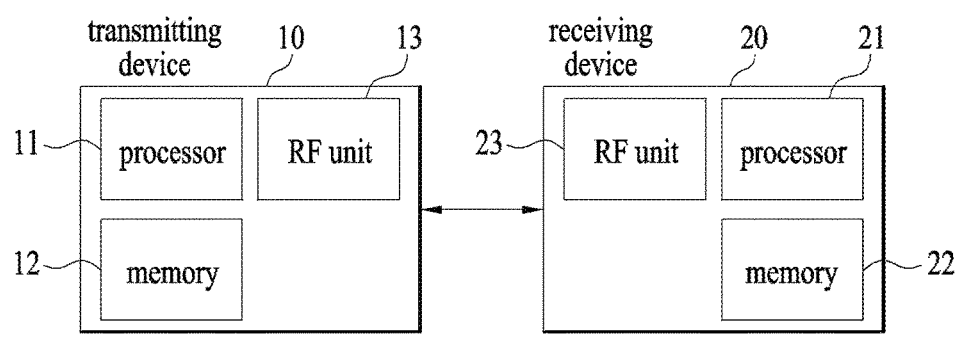
FIG. 16 is a block diagram of a device for implementing embodiment(s) of the present invention.

FIG. 16 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a UE, a relay, and a BS.

What is claimed is:

1. A method of reporting a channel state of a downlink channel transmitted through a two-dimensional (2D) array antenna element including at least one horizontal antenna group and at least one vertical antenna group, the method performed by a terminal, the method comprising:

receiving a channel state information-reference signal (CSI-RS) configuration for the at least one vertical antenna group and the at least one horizontal antenna group;

calculating channel state information of the downlink channel using the received CSI-RS configuration; and transmitting to a serving cell the channel state information of the downlink channel, wherein the channel state information includes individual channel state information on a vertical channel for the at least one vertical antenna group and a horizontal channel for the at least one horizontal antenna group, joint of the individual channel state information, or integrated channel state information of the vertical channel and the horizontal channel, each of the channel state information having a transmission priority, wherein the channel state information is transmitted according to the transmission priority, wherein the individual channel state information on the vertical channel has a transmission period set to have a specific relationship with a transmission period of the individual channel state information on the horizontal channel, and wherein the joint of the individual channel state information is configured to have a highest or lowest transmission priority among the individual channel state information.

2. The method of claim 1, wherein if at least two transmission instances in which the channel state information is transmitted overlap with each other, the rest of the channel state information are dropped except the channel state information having the highest transmission priority.

3. The method of claim 2, wherein if the transmission priorities of at least two channel state information are equal to each other, one of the at least two channel state information is dropped according to an additional reference.

4. The method of claim 3, wherein the additional reference is related to a transmission period of the individual channel state information.

5. The method of claim 1, wherein the transmission priority is related to a transmission period of the individual channel state information.

6. The method of claim 1, wherein the individual channel state information on the vertical channel comprises rank information of the vertical channel, first precoding information of the vertical channel, and second precoding information of the vertical channel, wherein the rank information of the vertical channel has a transmission period greater than that of the first precoding information of the vertical channel, and wherein the first precoding information of the vertical channel has a transmission period greater than that of the second precoding information of the vertical channel.

7. The method of claim 1, wherein the individual channel state information on the horizontal channel comprises rank information of the horizontal channel, first precoding information of the horizontal channel, and second precoding information of the horizontal channel, wherein the rank information of the horizontal channel has a transmission period greater than that of the first precoding information of the horizontal channel, and wherein the first precoding information of the horizontal channel has a transmission period greater than that of the second precoding information of the horizontal channel.

8. A terminal configured to report a channel state of a downlink channel transmitted through a two-dimensional (2D) array antenna element including at least one horizontal antenna group and at least one vertical antenna group, the terminal comprising:

a radio frequency (RF) unit; and a processor configured to:

control the RF unit to receive a channel state information-reference signal (CSI-RS) configuration for the at least one vertical antenna group and the at least one horizontal antenna group, calculate channel state information of the downlink channel using the received CSI-RS configuration, and control the RF unit to transmit to a serving cell the channel state information of the downlink channel, wherein the channel state information includes individual channel state information on a vertical channel for the at least one vertical antenna group and a horizontal channel for the at least one horizontal antenna group, joint of the individual channel state information, or integrated channel state information of the vertical channel and the horizontal channel, each of the channel state information having a transmission priority, wherein the channel state information is transmitted according to the transmission priority, wherein the individual channel state information on the vertical channel has a transmission period set to have a specific relationship with a transmission period of the individual channel state information on the horizontal channel, and wherein the joint of the individual channel state information is configured to have a highest or lowest transmission priority among the individual channel state information.

9. A method of reporting a channel state of a downlink channel transmitted through a two-dimensional (2D) array antenna element including at least one horizontal antenna group and at least one vertical antenna group, the method performed by a terminal, the method comprising:

receiving a channel state information-reference signal (CSI-RS) configuration for the at least one vertical antenna group and the at least one horizontal antenna group;

calculating channel state information of the downlink channel using the received CSI-RS configuration; and transmitting to a serving cell the channel state information of the downlink channel, wherein the channel state information includes individual channel state information on a vertical channel for the at least one vertical antenna group and a horizontal channel for the at least one horizontal antenna group, joint of the individual channel state information, or integrated channel state information of the vertical channel and the horizontal channel, each of the channel state information having a transmission priority, wherein the channel state information is transmitted according to the transmission priority, wherein the integrated channel state information of the vertical channel and the horizontal channel comprises integrated channel quality information of the vertical channel and the horizontal channel, and wherein the integrated channel quality information has a transmission period smaller than that of the individual channel state information on the vertical channel and the individual channel state information on the horizontal channel.

* * * * *